(12) United States Patent
Nakamura et al.

(10) Patent No.: US 7,017,478 B2
(45) Date of Patent: Mar. 28, 2006

(54) GRINDING SLUDGE COMPACTING MACHINE

(75) Inventors: Kanji Nakamura, Iwata (JP); Katsuhiro Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/802,736

(22) Filed: Mar. 18, 2004

(65) Prior Publication Data
US 2004/0250710 A1    Dec. 16, 2004

Related U.S. Application Data

(62) Division of application No. 10/185,015, filed on Jul. 1, 2002, now Pat. No. 6,745,679.

(30) Foreign Application Priority Data

Jul. 3, 2001    (JP) .............................. 2001-202058
Aug. 31, 2001    (JP) .............................. 2001-262931

(51) Int. Cl.
*B30B 9/02*    (2006.01)
*B30B 9/06*    (2006.01)
*B30B 15/30*    (2006.01)
*B30B 7/04*    (2006.01)

(52) U.S. Cl. .................. 100/104; 100/110; 100/118 R; 100/215; 100/218; 100/245

(58) Field of Classification Search ................ 100/104, 100/110, 125–127, 215–218, 226, 240, 43–50, 100/295, 188 R
See application file for complete search history.

(56) References Cited

U.S. PATENT DOCUMENTS 3,688,686 A    9/1972    Ligh
3,811,813 A *  5/1974    Taccone ....................... 425/579
3,980,014 A    9/1976    McEwen et al.
4,260,488 A    4/1981    Condolios
4,387,633 A    6/1983    Ballantyne
4,389,928 A *  6/1983    Burgin ......................... 100/37
4,575,392 A    3/1986    Julliard et al.
4,755,332 A    7/1988    Mizuno et al.
5,146,848 A    9/1992    Dufour (Continued)

FOREIGN PATENT DOCUMENTS

DE    4040430    7/1991

(Continued)

OTHER PUBLICATIONS

Patent Abstracts of Japan; Publication No.2001-315000; Nov. 13, 2001; NTN Corp.

*Primary Examiner*—Derris H. Banks
*Assistant Examiner*—Shelley Self

(57) ABSTRACT

A compressing machine includes a press unit for compressing a concentrated sludge within a squeezing chamber to provide a briquette, and a press control unit to control the press unit. The press control unit includes a parameter and compressing speed setting unit, a parameter measuring unit, and a compressing speed control unit. The parameter and compressing speed setting unit is a unit in which a relation between a predetermined parameter that may affect compression performed by the press unit, and a compressing speed of the press unit. The predetermined parameter may include a coolant temperature, ambient temperature or a coolant content and others. The parameter measuring unit is a unit to measure the predetermined parameter. The compressing speed control unit controls, based on a result of measurement by the parameter measuring unit, the compressing speed of the press unit in accordance with a content set in the parameter and compressing speed setting unit.

7 Claims, 7 Drawing Sheets

U.S. PATENT DOCUMENTS

| | | |
|---|---|---|
| 5,307,739 A | 5/1994 | Gourdol |
| 5,386,768 A | 2/1995 | Goetz |
| 5,524,534 A * | 6/1996 | Dietel .................. 100/209 |
| 5,575,200 A | 11/1996 | Hartmann |
| 5,613,434 A | 3/1997 | Hartmann |
| 6,176,697 B1 | 1/2001 | Middleton |
| 6,349,638 B1 * | 2/2002 | Thompson .................. 100/218 |
| 2001/0050006 A1 | 12/2001 | Nakamura et al. |

FOREIGN PATENT DOCUMENTS

| | | |
|---|---|---|
| DE | 4446494 | 6/1996 |
| DE | 198 12 459 | 10/1998 |
| EP | 1 149 926 A2 | 10/2001 |
| EP | 1 149 926 A3 | 9/2002 |
| FR | 2 577 167 | 8/1986 |
| JP | 56023399 | 3/1981 |
| JP | 05-293737 | 11/1993 |
| JP | 2002137095 | 5/2002 |

* cited by examiner

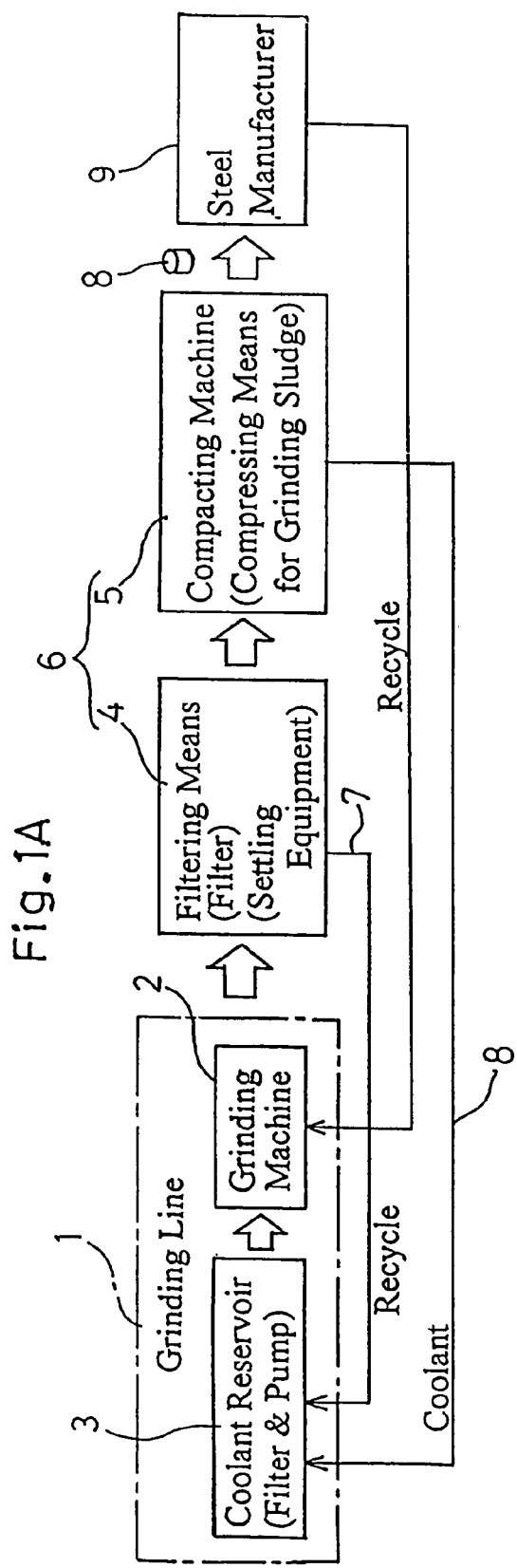
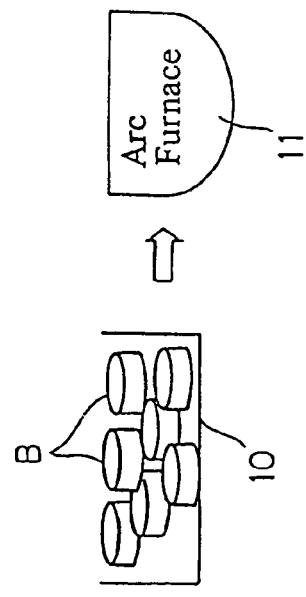
Fig. 1A
Fig. 1B

Normal Coolant Content

Excessive Coolant Content

GRINDING SLUDGE COMPACTING
MACHINE

CROSS-REFERENCE TO RELATED
APPLICATIONS

This application is a divisional of application Ser. No. 10/185,015, filed Jul. 1, 2002, now U.S. Pat. No. 6,745,679. This application is based upon and claims the priority of Japanese application no. 2001-202058, filed Jul. 3, 2001, Japanese application no. 2001-262931, filed Aug. 31, 2001 and U.S. patent application Ser. No. 10/185,015, filed Jul. 1, 2002, the contents being incorporated herein by reference.

BACKGROUND OF THE INVENTION

1. Field of the Invention

The present invention relates to a grinding sludge compacting machine for compressing a grinding sludge of hardened component parts produced in a grinding line, for example, a grinding sludge of ferrous component parts such as inner and outer races and rolling elements and others of rolling bearings and other bearing steel material, to thereby provide a briquette.

2. Description of the Related Art

Ferrous component parts of rolling bearings such as inner and outer races and rolling elements are, after having been hardened, subjected to a grinding process to grind raceways and others. Powdery grinding scraps produced as a result of the grinding are discharged as a sludge together with a coolant to the outside of the system and are then filtered so that the coolant can be reused. The grinding sludge left as a result of the filtration is in most cases buried in landfill.

However, not only is the use of the grinding sludge for landfill generally considered undesirable from the standpoint of environmental pollution, but also it is obvious that in view of the waste treatment sites reaching an dead end, the grinding sludge would no longer be used for land reclamation. Although the amount of the grinding scraps produced as a result of the grinding is relatively small as compared with the amount of cutting scraps, a mass-production line for manufacture of, for example, bearings results in a relatively large quantity of the grinding scraps For this reason, it has been suggested to compress the grinding sludge by squeezing to provide a compressed material (referred hereinafter to as a "briquette") so that the coolant squeezed therefrom can be reused while the briquette can be used as a material for steel production.

While the grinding sludge using an aqueous coolant can easily be compressed to provide the briquette, an oil-based coolant has a higher viscosity than that of the aqueous coolant and, therefore, the grinding sludge using the oil-based coolant poses various problems in compressing it. By way of example, during squeezing the oil-based coolant is difficult to be drained and even though the pressure used during squeezing is increased, compression of the grinding sludge to a required strength cannot be achieved. For this reason, compression of the grinding sludge containing the oil-based coolant has not yet been practiced.

Compression of the grinding sludge is considerably affected by the viscosity of the coolant being squeezed during the compressing process. Not only where the coolant is oil-based, but also where it is water-based, it tends to be considerably affected by the coolant viscosity. In particular, at the time of the start-up in the morning during the winter season, the grinding sludge compacting machine and the grinding sludge are both cold with the coolant consequently exhibiting a high viscosity enough to make it difficult for the coolant to be discharged through a gap. Accordingly, when attempt is made to forcibly apply a pressure to the grinding sludge to compress the latter, the coolant and the grinding scraps are mixed to form a sludge which subsequently flow out, making it difficult for the grinding sludge to be satisfactorily compressed.

As a machine for compressing a grinding sludge containing an oil-based coolant, the applicant(s) of the present invention has suggested a machine in which the pressure used for squeezing is controlled to a predetermined value and a predetermined compressing speed such as described in the Japanese Laid-open Patent Publication No. 2001-315000. According to this prior invention, the grinding sludge containing the oil-based coolant of a high viscosity can be satisfactorily compressed. However, it cannot accommodate change in parameter that affects the squeezing and, in the event that the parameter such as, for example, the ambient temperature or the oil content in the grinding sludge that affects the squeezing changes, it may be suspected that no satisfactory squeezing to provide the briquette can be achieved.

In general, because the grinding sludge contains so large a quantity of the coolant that the grinding sludge cannot be squeezed directly, the grinding sludge containing the coolant is, prior to being squeezed, filtered to provide a concentrated sludge which is subsequently compressed by the grinding sludge compacting machine to provide a briquette.

The grinding sludge compacting machine for compressing the grinding sludge has hitherto been available in the following two types; a gate type and a plug-like double cylinder type.

The gate type grinding sludge compacting machine includes, as shown in FIG. 9, a cylindrical mold 81 for accommodating a grinding sludge therein, a gate 82 for closing one end of the cylindrical mold 81 and a pressure applying piston 83 reciprocatingly movably inserted in the cylindrical mold 81 from the opposite end thereof. By pressing the piston 83 by means of a pressure applying cylinder 85, the grinding sludge can be squeezed within the cylindrical mold 81 to provide a briquette B.

The grinding sludge compacting machine of the plug-like double cylinder type includes, as shown in FIG. 10, a cylindrical mold 91 and first and second pressure applying pistons 92 and 93 reciprocatingly movably inserted in the cylindrical mold 91 through opposite ends thereof, respectively. The first and second pistons 92 and 93 are pressure applying sub-piston and main piston, respectively, which are driven by a sub-cylinder 94 and a main cylinder 95, respectively. The sub-piston 92 is held at a fixed position during the squeezing process and is adapted to be retracted away from the cylindrical mold 91 when the resultant briquette B is to be ejected out of the cylindrical mold 91.

The foregoing two systems have their own problems which will now be discussed.

(1) Gate Type (FIG. 9)

Since the sliding gate 82 is almost unable of being sealed against the cylindrical mold 81, it works while the grinding sludge is intruded into a gap therebetween and, for this reason, frictional wear is apt to occur. Once rattling occurs because of it, the gap increases and, once this gap increases to a size exceeding a limit, either the grinding sludge will blow off during the compressing operation, or the sludge will solidify within the gap between the gate 82 and the end face of the sleeve 81 with the coolant being consequently unable to be drained, resulting in difficulty in accomplishing the compression of the grinding sludge. Also, since the gate selectively open or close while the briquette B is purged firmly against the gate 82, frictional wear of respective contact surfaces of the gate 82 and the briquette B, respectively, progresses. Once the quantity of the frictional wear increases to a value in excess of a limit, the phenomenon similar to that discussed above occurs, resulting in difficulty in completing the compression of the grinding sludge.

(2) Plug-like Double Cylinder Type (FIG. 10)

At the time of compression and ejection of the briquette B, the briquette B is pushed by the pressure applying main cylinder 95 while an outer peripheral surface of the briquette B is firmly urged against an inner peripheral surface of the sleeve 91. For this reason, the inner peripheral surface of the sleeve 91 is susceptible to frictional wear and, when in the last, a gap between an outer peripheral surface of the sub-piston 92 and the inner peripheral surface of the sleeve 91 increases to a size in excess of a limit, either the grinding sludge will blow off during the compressing operation, or the sludge will solidify within the gap between respective outer peripheral surfaces of the pistons 92 and 93 and the inner peripheral surface of the sleeve to such an extent that the coolant cannot be drained satisfactorily, resulting in difficulty in completing the compression of the grinding sludge.

SUMMARY OF THE INVENTION

The present invention is, therefore, intended as its primary object to provide a grinding sludge compacting machine capable of satisfactorily compressing a grinding sludge, containing a coolant originating from a grinding line for hardened component parts, even though a parameter that would affect the squeezing process changes.

Another object of the present invention is to provide a capability of satisfactorily achieving a compression regardless of change in temperature.

A further object of the present invention is to provide a capability of efficiently compressing the grinding sludge regardless of change in content of the coolant in the grinding sludge.

A still further object of the present invention is to provide a grinding sludge compacting machine of the type referred to above that is robust to frictional wear, capable of satisfactorily compressing the grinding sludge and capable of being operated stably for a prolonged period of time.

To accomplish these objects, the present invention in accordance with one aspect thereof provides a grinding sludge compacting machine for making a briquette of a grinding sludge by squeezing a concentrated grinding sludge that is a grinding sludge which has been produced in a grinding line by grinding hardened component parts while containing a coolant and which is obtained by filtering the grinding sludge. The grinding sludge compacting machine includes a press unit having a squeezing chamber defined therein and operable to compress the concentrated sludge by application of a pressure within the squeezing chamber, and a press control means for controlling the press unit. The press control means includes a parameter and compressing speed setting means in which a relation between a predetermined parameter that affects the squeezing by the press unit and a compressing speed of the press unit is set, a parameter measuring means for measuring the predetermined parameter, and based on the result of measurement by the parameter measuring means, a compressing speed control means for controlling the compressing speed of the press unit in accordance with a content set by the parameter and compressing speed setting means.

When the grinding sludge is being squeezed to eventually provide a briquette, the compressing speed is affected by the viscosity of the coolant and the fine interstices in the grinding sludge and in turn affects the squeezing process and a result thereof considerably. A proper compressing speed depends on various parameters such as, for example, the viscosity of the coolant. However, according to the first aspect of the present invention discussed above, the relation between the predetermined parameter which would affect the squeezing and the proper compressing speed of the press unit is determined and is then set in the parameter and compressing speed setting means so that during the squeezing operation the predetermined parameter can be measured by the parameter measuring means to enable the compressing speed to be controlled in accordance with the relation between the predetermined parameter and the compressing speed that has been set in the parameter and compressing speed setting means. Accordingly, even though the parameter that affects the squeezing varies in numerous ways, the grinding sludge compacting machine can accommodate such change to compress the grinding sludge satisfactorily and efficiently to provide a satisfactorily finished briquette.

Preferably, the predetermined parameter is the temperature selected from the group consisting of the temperature of the coolant contained in the concentrated sludge, the ambient temperature of the press unit and a temperature of a predetermined portion of the press unit. In this case, the parameter measuring means preferably measures the temperatures or the ambient temperature and, based on a result of measurement performed by the parameter measuring means, the compressing speed by the press unit is controlled by the compressing speed control means in accordance with the content of the temperature or the ambient temperature and the compressing speed set in the parameter and compressing speed setting means. It is to be noted that the temperature of the coolant contained in the concentrated grinding sludge may be that before the grinding sludge is supplied into the press unit or that after the grinding sludge has been supplied into the press unit.

By way of example, at the time of start-up of the grinding sludge compacting machine, the compacting operation is initiated with the compressing speed automatically determined according to the measured temperature and the measured ambient temperature. As the compacting operation proceeds, the coolant temperature and the ambient temperature increase with the machine warmed up and, accordingly, in pursuit for change in coolant temperature and in ambient temperature, the compressing speed is automatically, for example, stepwise increased to enable the compressing operation to take place under an ordinary state. In this way, the satisfactory compression of the grinding sludge can be achieved with the compressing speed determined properly in dependence on the change in coolant temperature and others.

Alternatively, the predetermined parameter may be the content of the coolant in the concentrated sludge, in which case the parameter measuring means measures the content of the coolant and, based on a result of measurement performed by the parameter measuring means, the compressing speed by the press unit is controlled by the compressing speed control means in accordance with the content of the coolant contents and the compressing speed set in the parameter and compressing speed setting means. It is to be noted that the coolant may be an oil-based coolant or a water-based coolant.

The content of the coolant contained in the concentrated sludge to be supplied into the press unit inevitably varies depending on a condition prior to the treatment. Once the coolant content varies, the compression of the grinding sludge will be affected as follows. If the coolant content is high, the grinding scraps and the coolant are mixed to form a sludge easy to flow out when it is forcibly compressed by the press unit and, accordingly, either is the yield of the grinding scraps that can be compressed reduced, or in the worst case it may occur the total amount of the grinding sludge will flow out to such an extent as to render the compression of the grinding sludge difficult. In such case, the squeezing operation has to be performed with the compressing speed lowered. On the other hand, if the coolant content is low, the coolant will not flow out in the form of a sludge and compression can easily be performed and, accordingly, the compressing speed can be accelerated.

In view of the foregoing, by measuring the coolant content at all times and performing a control of the compressing speed in dependence on the change in coolant content based on the result of measurement, it is possible to achieve the compression efficiently with any fault in compression eliminated and with no need to lower the compressing speed.

The parameter measuring means may not be always limited to measure the coolant content directly, but may be designed to measure the coolant content in consequence. Accordingly, the parameter measuring means may be of a type capable of measuring an advanced position of a pressure applying piston, provided in the press unit, during a compressing operation. In this case, the parameter and compressing speed setting means has set therein a threshold value representative of a position, which corresponds to an ordinary advanced end of the advanced position of the piston, and a compressing speed for each division divided by such threshold value, and the compressing speed control means preferably compares a result of measurement of the piston advanced position, measured by the parameter measuring means during a compressing operation, with the threshold value, to thereby control the compressing speed in accordance with the content set in the parameter and compressing speed setting means.

The advanced position of the pressure applying piston of the press unit during the compressing operation varies depending on the coolant content in the concentrated grinding sludge. Specifically, if the coolant content is high, the advanced position will be forwardly of the position assumed when the coolant content is ordinary. Accordingly, by automatically cyclically measuring the advanced position of the piston, the compressing speed is lowered when the advanced position is forwardly of a threshold value that is set as the position assumed when the coolant content is ordinary. By so doing, even where the compression of the concentrated grinding sludge is difficult to achieve because of the high coolant content, a satisfactory compression can be achieved.

The parameter measuring means may be of a design capable of measuring the coolant content in terms of change in compressing pressure. By way of example, the parameter measuring means may measure a length of time required for a predetermined compressing pressure to be attained subsequent to start of compression when the concentrated sludge is compressed by the press unit. In this case, the parameter and compressing speed setting means has set therein a threshold value of the length of time and a compressing speed for each division divided by the threshold value, and the compressing speed control means compares the length of time, measured by the parameter measuring means, with the threshold value to thereby control the compressing speed in accordance with a content set in the parameter and compressing speed setting means.

Where the grinding sludge is to be compressed to provide the briquette, the coolant is squeezed during the first half of the compressing process and the grinding scraps are compressed during the latter half of the compressing process. For this reason, during the first half of the compressing process, a relatively low compressing pressure effective to squeeze the coolant is sufficient. For this reason, when the low compressing pressure is employed during the first half of the compressing process, the speed of movement of the pressure applying piston is affected by the concentrated sludge supplied into the squeezing chamber and, hence, the length of time required for the predetermined compressing pressure to be attained varies. If the coolant content is high, the coolant quickly fills up the squeezing chamber and quickly attains a predetermined compressing pressure at which switching of a low compressing pressure over to a high compressing pressure takes place. By monitoring the length of time required for the threshold value, that is the predetermined compressing pressure at the low compressing pressure, to be attained subsequent to such a phenomenon and then by controlling the compressing speed at the high compressing pressure according to the length of time so required, a stabilized normal compression of the grinding sludge can be realized.

In a second aspect, the present invention provides a grinding sludge compacting machine for compressing for making a briquette of a grinding sludge by inserting a concentrated grinding sludge formed by filtering a grinding sludge, produced in a grinding line by grinding hardened component parts while containing a coolant, into a press unit comprising a cylindrical mold fixed on a machine bench, a first piston reciprocatingly movably inserted in the cylindrical mold and a second piston arranged in face-to-face relation with the first piston, and compressing the concentrated sludge. In this compacting machine, the second piston has one end of a diameter larger than an inner diameter of the cylindrical mold.

With this compacting machine, the concentrated sludge supplied into the cylindrical mold is compressed by and between the first and second piston to provide the briquette. The second piston has one end that is of a diameter larger than the inner diameter of the cylindrical mold and is used to close the annular open end of the cylindrical mold when brought adjacent thereto and, therefore, upon completion of the compressing operation, the second piston is retracted in a direction away from the cylindrical mold while the first piston pushes the compressed material, that is, the briquette to eject the latter out of the cylindrical mold. In this way, since the second piston when retracted away from the cylindrical mold opens the annular open end of the cylindrical mold, no relative slippage such as observed in the gate type compacting machine will occur in the surface of the second piston and also in a surface of the compressed material that contacts such surface of the second piston and, consequently frictional wear hardly occur in the surface of the compressed material contacting the surface of the second piston. Sealing required to avoid blow-off of the grinding sludge during the compressing operation is achieved at and between the annular end face of the cylindrical mold and the second piston. Also, since the sealing is achieved at and between the annular end face of the cylindrical mold and the second piston, unlike the plug-like double cylinder type, even when the inner peripheral surface of the cylindrical mold undergoes frictional wear as the resultant briquette is compressed or pushed by the first piston, the sealing function will not be adversely affected. The grinding sludge compacting machine according to this aspect is thus substantially free from any influence which would otherwise be brought about by the frictional wear and can therefore work (perform the compressing operation) for a prolonged period of time in a stabilized manner, resulting in reduction in maintenance cost.

Preferably, the end of the second piston defines a gap in cooperation with an annular end of the cylindrical mold when the second piston is held in position adjacent the cylindrical mold, said gap defining a coolant drain passage. The gap referred to above may be of a size within the range of 0.05 to 1.0 mm.

The capability of the coolant being drained will considerably affect the efficiency of the compressing operation and the quality, but if the gap between the end of the second piston and the annular end face of the cylindrical mold is utilized as the coolant drain passage, a drain circuit for drainage of the coolant can easily be defined. If this gap defining the coolant drain passage is too small, the drainage of the coolant will be adversely affected, but if this gap is conversely too large, a problem would occur that the grinding sludge will blow off from the cylindrical mold or that the grinding sludge will be clogged within the gap to such an extent as to result in incapability of the coolant being drained. Accordingly, when the gap is chosen to be of a size within the range of 0.05 to 1.0 mm, a favorable drainage of the coolant can be secured and, on the other hand, it is also possible to avoid any possible blow-off of the grinding sludge.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1A is a block diagram showing a concept of a grinding sludge processing method performed by the use of a grinding sludge compacting machine for making briquettes of a grinding sludge according to a first preferred embodiment of the present invention;

FIG. 1B is an explanatory diagram showing the manner of utilization of the briquettes made by the grinding sludge compacting machine;

DETAILED DESCRIPTION OF THE PREFERRED EMBODIMENTS

Figure 2:
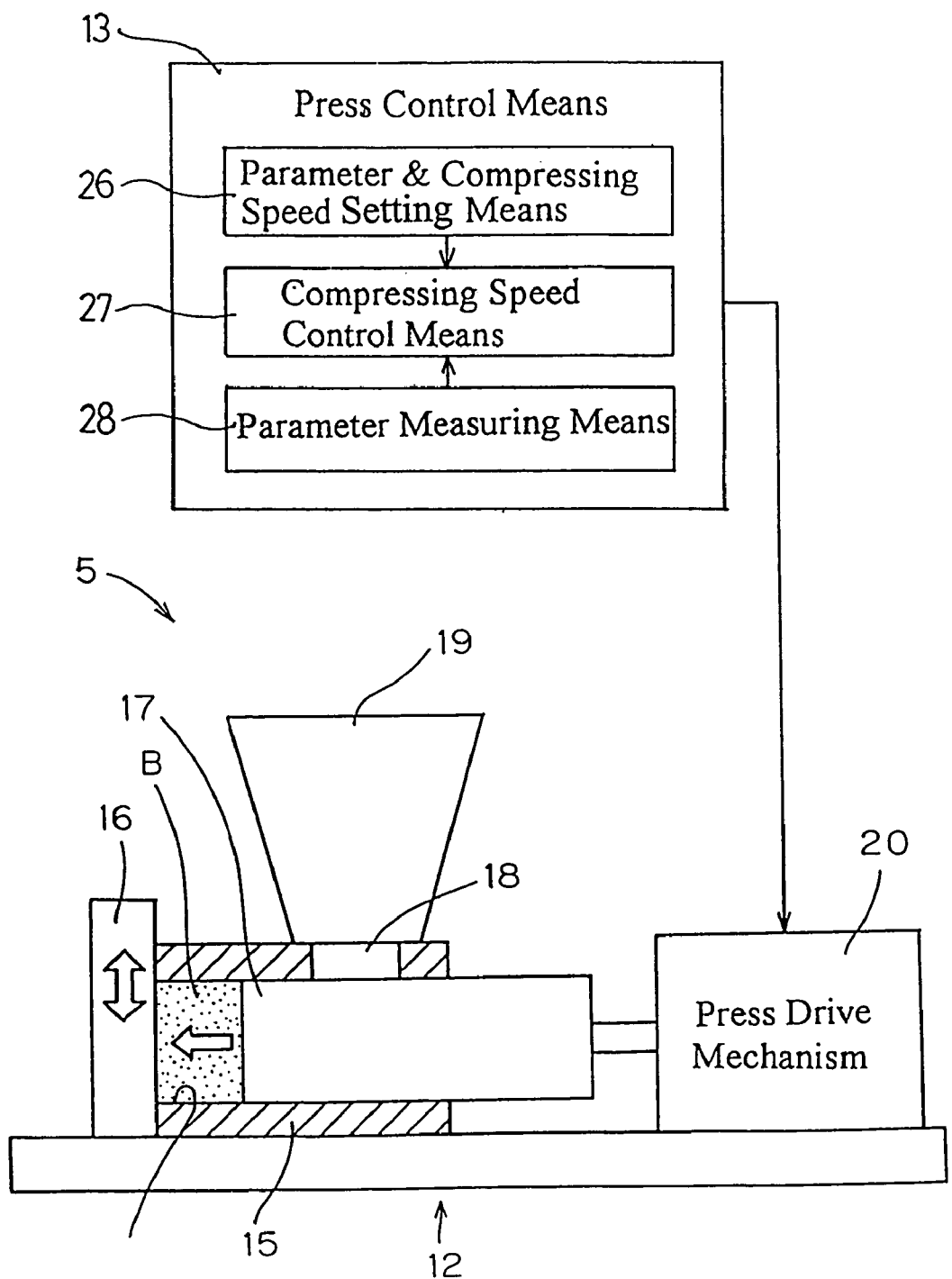
FIG. 2 is a schematic diagram showing a press unit, forming a part of the grinding sludge compacting machine according to the first preferred embodiment of the present invention, shown together with a press control means operatively connected therewith.

A preferred embodiment of a grinding sludge compacting machine for making a compressed material (hereinafter referred to as a "briquette") from a grinding sludge will now be described. FIG. 1 is a block diagram showing a grinding sludge processing method and a grinding sludge processing apparatus including the grinding sludge compacting machine. The grinding line 1 includes a grinding station at which grinding is performed with the use of a grinding machine 2 while a coolant from a coolant reservoir 3 is supplied. A grinding sludge containing grinding scraps, produced by the grinding machine 2 and the used coolant is subsequently filtered by a filtering means 4 to provide a solid filtrate, that is, a concentrated sludge which is in turn squeezed by the grinding sludge compacting machine 5, constructed in accordance with the present invention, to provide a compressed material, that is, a briquette B. It is to be noted that the filtering means 4 and the grinding sludge compacting machine 5 altogether constitute a briquetting apparatus 6. The filtering means 4 may include, for example a settling equipment and a filtering equipment utilizing a filter for filtering the grinding sludge sedimented in the settling equipment. The coolant filtered through the filtering means 4 and the coolant squeezed from the grinding sludge compacting machine 5 are recovered back to the coolant reservoir 3 of the grinding line 1 through fluid recovery circuits 7 and 8. From these fluid recovery circuit 7 and 8, the coolant is returned to the coolant reservoir 3 by means of a filter and a pump. The coolant is also supplied from the coolant reservoir 3 to the grinding machine 2 by means of a pump through a filter. The briquette B made by the grinding sludge compacting machine 5 is transported to a steel manufacturer 9 where the briquette B is subsequently utilized as a steel material. Transport of the briquette B is carried out by the utilization of a truck transporting a transport vessel 10, known as such as a flexible container bag, containing a plurality of such briquettes B as shown in FIG. 1B. At the steel manufacturer 9, the briquettes B are reproduced as a steel material by means of an arc furnace 11 or the like. The steel material so manufactured is in turn used as a raw material for a steel product to be ground.

The steel product to be ground at the grinding line 1 is generally in the form of a hardened steel product such as, for example, bearing members made of a bearing steel or the like. By way of example, the hardened steel product may be ferrous component parts of rolling bearings including, for example, raceway members such as inner races and outer races, and/or rolling elements such as balls or the like. The coolant used during the grinding is generally in the form of an oil-based coolant. The bearing steel includes, for example, rough hardened material such as high carbon chrome steel (SUJ2 and so on), a high frequency hardened material such as medium carbon steel (S53C and so on), a carburized hardened material such as case hardening steel (SCR415 and so on) and so on.

The grinding sludge produced by the grinding machine 2 is generally in the form of a slurry containing 90 wt % of the coolant, the balance being a mass of grinding scraps and a small quantity of grindstone particles. The grinding scraps generally represents a curled, short fibrous shape. The grinding sludge, when filtered by the filtering means 4 to provide the concentrated sludge, contains the coolant in a quantity about half of the weight of the concentrated sludge. The concentrated sludge is of a composition including, for example, about 50 wt % of grinding scraps of bearing steel or the like, about 50 wt % of the coolant and a small quantity of grindstone particles.

The composition of the briquette B is steel, most of which is grinding scraps, 5 to 10 wt % of the coolant and a small quantity of grindstone particles remaining after most of the composition has been drained together with the coolant during a compression process. If the grinding scraps are high quality steel such as bearing steel or the like even though the briquette B contains a small quantity of the grindstone particles, the use of it as a material for production of steel poses no problem. The briquette B has a predetermined strength, for example, such a strength that when the briquette B is fallen onto a surface from a height of, for example, 1 meter, the number of debris of the briquette B does not exceed three. It is, however, to be noted that no binder (such as a powder of grinding scraps) for binding the grinding scraps together is mixed in the briquette B at all.

The grinding sludge compacting machine 5 according to the first preferred embodiment of the present invention includes, as shown in FIG. 2, a press unit 12 and a press control means 13 for controlling the press unit 12. The press unit 12 is a means for compressing the concentrated sludge within a squeezing chamber 14 by the application of a pressure to achieve compactization and includes a press drive mechanism 20 for applying the compressing pressure. The squeezing chamber 14 is defined in the interior of a cylinder 15, having been delimited by a gate 16 for selectively opening and closing one open end of the cylinder 15 and a pressure applying piston 17 inserted into the interior of the cylinder 15 from the opposite open end thereof and reciprocatingly movable between retracted and compressed positions. The gate 16 is drivingly coupled with a gate drive mechanism (not shown) so that the gate 16 can be moved selectively between the opened and closed positions. The pressure applying piston 17 can be driven selectively between the retracted and compressed positions by the press drive mechanism 20. The cylinder 15 has an inlet port 18 defined therein for receiving the concentrated sludge to be supplied into the squeezing chamber, which port 18 is communicated with a hopper 19 mounted atop the cylinder 15.

Figure 3:
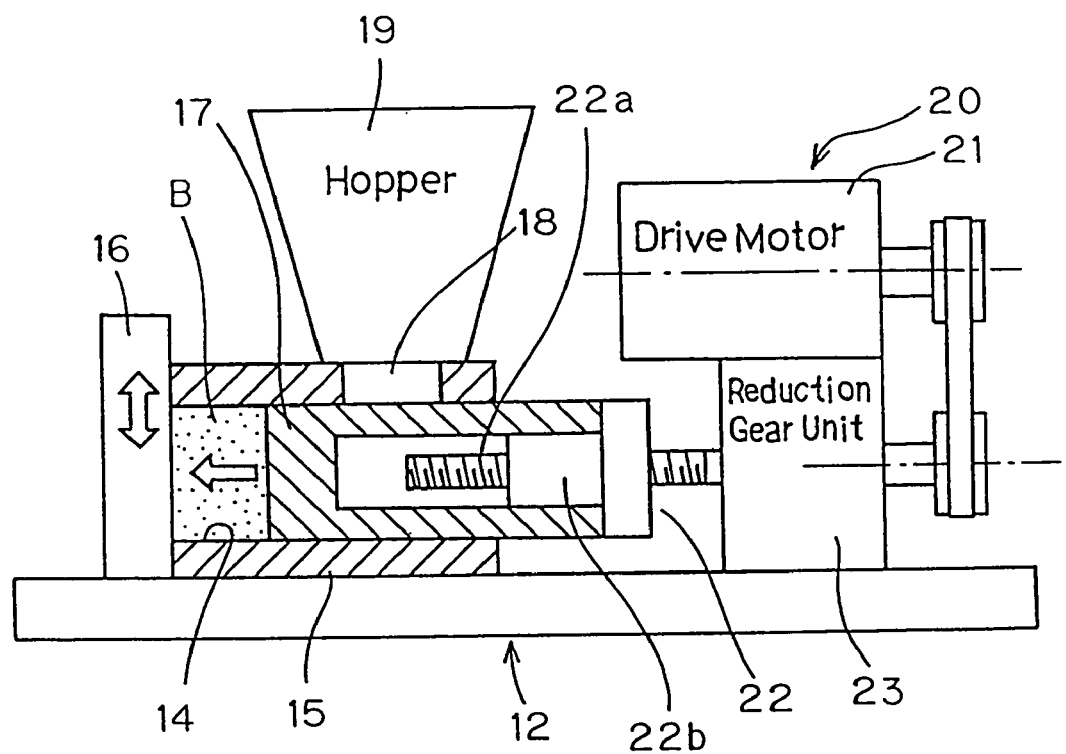
FIG. 3 is a front sectional view, with a portion cut out, of the grinding sludge compacting machine showing the details thereof.

The press drive mechanism 20 includes, for example as shown in FIG. 3, a servo drive motor 21 and a rotary-to-linear motion translating mechanism 22 for translating a rotary motion produced by the servo drive motor 21 into a linear movement assumed by the pressure applying piston 17. The rotary-to-linear motion translating mechanism 22 includes a ball screw assembly including a ball screw shaft 22a adapted to be rotated by the servo motor 21 through a reduction gear unit 23 and a ball nut 22b mounted threadingly on the ball screw shaft 22a and fixedly connected with the pressure applying piston 17.

The press drive mechanism 20 may not be always driven by the servo drive motor 21 as shown, but may be driven by any suitable drive source such as any known hydraulic cylinder (not shown). Where the hydraulic cylinder is used as a drive source for the press drive mechanism 20, the use may be necessitated of a control valve (not shown) such as, for example, a servo valve or the like in a hydraulic circuit therefor so as to render the compressing speed performed by the press unit 12, that is, the speed at which the pressure applying piston 17 is linearly driven, to be adjustable.

Referring back to FIG. 2, the press control means 13 includes a parameter and compressing speed setting means 26 in which a relation between the compressing speed of the press unit 12 and at least one of various predetermined parameters that would affect a squeezing operation of the press unit 12, a parameter measuring means 28 for measuring the predetermined parameters, and a compressing speed control means 27 for controlling the compressing speed of the press unit 12 according to a predetermined content of the parameter and compressing speed setting means 26 on the basis of a result of measurement by the parameter measuring means 28.

The predetermined parameter that may affect the squeezing operation includes temperatures, coolant content and so on, but the temperatures as the predetermined parameter will first be discussed. The temperatures that may affect the squeezing operation includes the temperature of the coolant contained in the concentrated sludge within the press unit 12, the ambient temperature of the press unit 12 and/or the temperature of a predetermined locality, for example, the cylinder 20 of the press unit 12. The parameter measuring means 28 measures at least one of those temperatures. This parameter measuring means 28 may be a thermocouple or a semiconductor temperature sensing element. Where the temperature of the coolant contained in the concentrated sludge is to be measured, either the temperature of the coolant after the concentrated sludge has been supplied into the squeezing chamber 14 or that before the concentrated sludge is supplied into the squeezing chamber 14 may be measured.

The parameter and compressing speed setting means 26 sets forth a relation between the temperature and the compressing speed in the form of a relation table or the like between temperature divisions and compressing speeds. The temperature division are preferably set in a plural number so that the compressing speed can be progressively increased. In setting this relation, the relation between the compressing speed and the temperature (or the ambient temperature) at which the concentrated sludge can be normally compressed has to be determined by way of a series of trial runs and calculations to be done prior to the grinding sludge compacting machine 5 being first used. The compressing speed control means 27 is operable based on a result of measurement of the parameter measuring means 28 to control the compressing speed of the press unit 12 caused by the press drive mechanism 20 according to a preset content of the parameter and compressing speed setting means 26.

The operation of the grinding sludge compacting machine 5 of the structure described above will now be discussed. While the pressure applying piston 17 is in the retracted position, a predetermined quantity of the concentrated sludge is supplied into the squeezing chamber 14 of the cylinder 15 through the hopper 19. After the supply of the concentrated sludge, the press drive mechanism 20 is activated to advance the pressure applying piston 17 towards the compressed position to compress the concentrated sludge within the squeezing chamber 14 so that as a result of this pressure application the concentrated sludge can be a compressed material that is referred to as the briquette B. The briquette B so made is ejected out of the cylinder 15 when the gate 16 is subsequently opened.

During the compression being performed in the manner described above, the speed at which the pressure applying piston 17 is advanced, that is, the compressing speed is controlled by the compressing speed control means 27 in the manner which will now be described. The parameter and compressing speed setting means 26 stores therein the relation between the compressing speed and the temperature (or the ambient temperature), which has been previously determined as a combination of these parameters at which the normal squeezing operation, i.e., the operation to compress the concentrated sludge normally to produce the briquette B, can take place. At the start-up of the grinding sludge compacting machine 5, the compressing speed is automatically set according to the temperature or the ambient temperature measured by the parameter measuring means 28 to start the compressing operation. As the compressing operation proceeds, the coolant temperature and the ambient temperature increase and the grinding sludge compacting machine 5 is warmed up as well and, accordingly, in accordance with change in coolant and ambient temperatures, the compressing speed is automatically, but progressively increased to attain a steady state of normal compressing operation. In this way, by allowing the compressing speed to vary in consistency with change in temperature such as the coolant temperature, a favorable compression to make briquettes can be performed.

In the press control means 13, the case in which the coolant content in the concentrated sludge is chosen for the predetermined parameter that may affect the squeezing or compressing operation will now be described. In this case, the parameter measuring means 28 is operable to measure the content of the coolant contained in the concentrated sludge. The coolant may be either oil-based or water-based. The coolant content means an oil content if the coolant is oil-based, but a water content if the coolant is water-based. The compressing speed control means 27 is operable to control the compressing speed of the press unit 12 according to a preset content descriptive of the coolant content and the compressing speed set in the parameter and compressing speed setting means 26.

The coolant content of the concentrated sludge to be supplied into the press unit 12 inevitably varies depending on a condition of a pre-treatment. Once the coolant content varies, the compression of the grinding sludge will be affected as follows:

(1) In Case of Increase of the Coolant Content:

If the concentrated sludge is pressurized by all means during compression by the press unit 12, the grinding scraps and the coolant are mixed to form a sludge that is easy to flow out and, accordingly, either is the yield of the grinding scraps that can be compressed reduced, or in the worst case it may occur the total amount of the grinding sludge will flow out to such an extent as to difficult in compressing the grinding sludge. Once this phenomenon occurs, there is no way other than to perform the compression by reducing the compressing speed.

(2) In Case of Decrease of the Coolant Content:

The coolant will not flow out in the form of a sludge and compression can easily be performed and, accordingly, the compressing speed can be accelerated.

For the reasons discussed above, the coolant content is measured at all times and, based on the result of measurement, the compressing speed has to be controlled as a function of change of the coolant content. By so doing, a compression fault can be eliminated and, also, without the compressing speed being unnecessarily reduced, an efficient compression is possible.

The parameter measuring means 28 referred to above may not be always limited to that for measuring the coolant content directly, but may be designed to have a capability of measuring the coolant content in consequence. In such case, the parameter measuring means 28 is preferably of a design in which the status of the compressing of the grinding sludge can be quantitatively determined at all times.

As a control system based on the measurement of the coolant content as discussed above, one of the following two systems, i.e., (1) piston-based measurement and (2) pressure-based measurement, can be employed, which are based on measurement of the advanced position of the piston and measurement of change in applied pressure, respectively.

(1) Piston-Based Measurement System

Figure 4A:
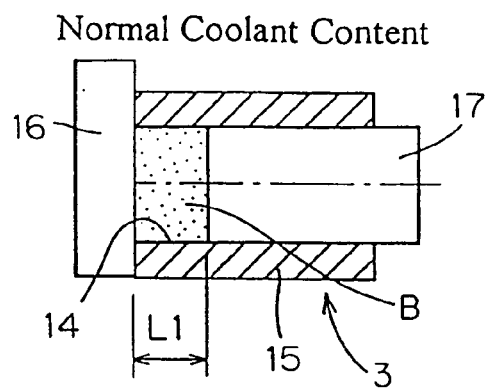
FIGS. 4A and 4B are explanatory diagrams showing the difference in position of a piston of the grinding sludge compacting machine depending on the coolant content.
Figure 4B:
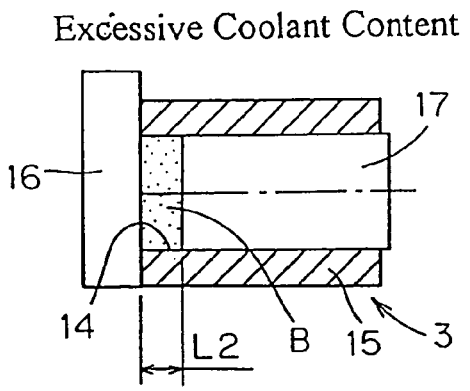

The parameter measuring means 28 is operable to measure the position of the pressure applying piston 17 that has been advanced during the compression effected by the press unit 12. This advanced position is defined by the distance L1 or L2, as shown in FIGS. 4A and 4B, between the bottom of the squeezing chamber 14, represented by the gate 16 in the closed position, and a front end face of the pressure applying piston 17. The parameter and compressing speed setting means 26 shown in FIG. 2 stores a threshold value descriptive of a normal advanced end of the piston advanced position and the compressing speed for each division divided by the threshold value. By way of example, the distance L1 shown in FIG. 4A is set as the threshold value. The compressing speed control means 27 is operable to compare a result of measurement of the piston advanced position by the parameter measuring means 28 during the compression with the threshold value so that the compressing speed can be controlled according to the content set in the parameter and compressing speed setting means 26.

As shown in FIGS. 4A and 4B, the position of the front end face of the pressure applying piston 17 during the compression in the press unit 12 varies depending on the coolant content and the position L2 (FIG. 4B) of the front end face of the pressure applying piston 17 when the coolant content is high will be forwardly of the position L1 (FIG. 4A) for the ordinary coolant content (normal coolant content) with respect to the direction of movement of the pressure applying piston 17 towards the compressed position.

In view of the foregoing, the position of the front end face of the pressure applying piston 17 is automatically measured cyclically and, in the event that the position of the front end face of the pressure applying piston 17 is forwardly of the threshold value set for the position thereof when the coolant content is ordinary (that is, in the event of L2 L1-s, where s represents an arbitrarily chosen set value), the compressing speed is lowered. In this way, a proper compression can be achieved even when the coolant content is so high as to render the compression to be difficult.

(2) Pressure-based Measurement

The parameter measuring means 28 shown in FIG. 2 is operable to measure the length of time required for a predetermined compressing pressure to be attained subsequent to start of compression. The parameter and compressing speed setting means 26 stores the compressing speed for each of divisions divided by the threshold value of the length of time required for the predetermined compressing pressure to be attained and this threshold. The compressing speed control means 27 is operable to compare the length of time so measured by the parameter measuring means 28 with the threshold value so that the compressing speed can be controlled according to the content set in the parameter and compressing speed setting means 26.

Where the grinding sludge is to be compressed to provide the briquette, the coolant is squeezed during the first half of the compressing process and the grinding scraps are compressed during the latter half of the compressing process. For this reason, during the first half of the compressing process, a relatively low compressing pressure effective to squeeze the coolant is sufficient. For this reason, when the low compressing pressure is employed during the first half of the compressing process, the speed of movement of the pressure applying piston 17 is affected by the grinding sludge (the concentrated sludge) supplied into the squeezing chamber 14 and, hence, the length of time required for the predetermined compressing pressure to be attained varies. This will now be discussed with particular reference to the graph of FIG. 5.

In the case of the normal operation, after the coolant has been squeezed, the grinding scraps are squeezed and compressed. On the other hand, in the event of an abnormality, as the compression proceeds, the grinding scraps and the coolants are mixed together to form a sludge which subsequently flows out.

Figure 5:
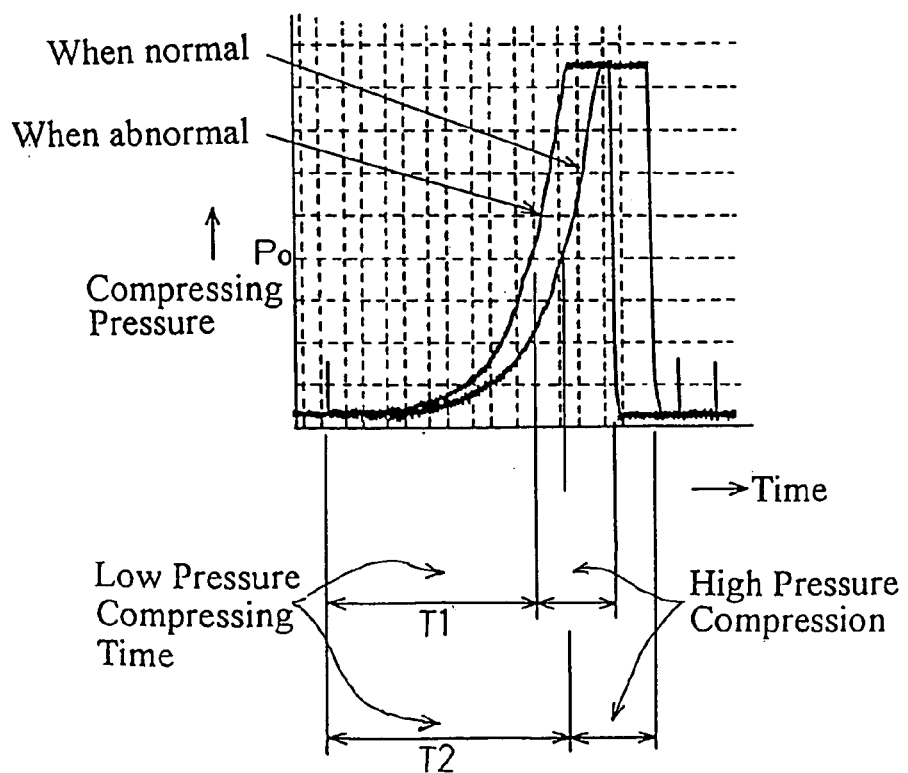
FIG. 5 is a chart showing a graph descriptive of the relationship between applied pressure and time depending on the coolant content.

Since the coolant content is high in the event of the abnormality (represented by a curve b) as compared with that in the event of the normal operation (represented by a curve a) as shown in FIG. 5, the squeezing chamber 14 is quickly filled with the coolant and the predetermined compressing pressure at which a low compressing pressure is switched over to a high compressing pressure can be quickly attained. In view of this phenomenon, by monitoring the length of time (T1, T2) required for the predetermined compressing pressure $P_0$ to be attained by the low compressing pressure, and then by the causing the compressing speed control means 27 to control the compressing speed with the high compressing pressure in dependence on the length of time (T1, T2), a stabilized normal compression can be realized. It is, however, to be noted that the length of time T2 required for the predetermined compressing pressure to be attained in the event of the normal operation is set in the parameter and compressing speed setting means 26 as the threshold value.

Where T1<T2, the compressing speed with the high compressing pressure is lowered to a value lower than a standard or reference compressing speed to prevent a flow-out of the sludge.

Where T1>T2, the compressing speed with the high compressing pressure is increased to a value higher than the standard or reference compressing speed to thereby increase the cycle speed.

Control of the compressing speed based on the length of time T1 or T2 can be applied not only to where the press drive mechanism 20 is in the form of a hydraulic cylinder, but also to where the press drive mechanism 20 is employed in the form of a servo drive motor such as in the embodiment shown in FIG. 3 to control the compressing pressure.

Figure 6:
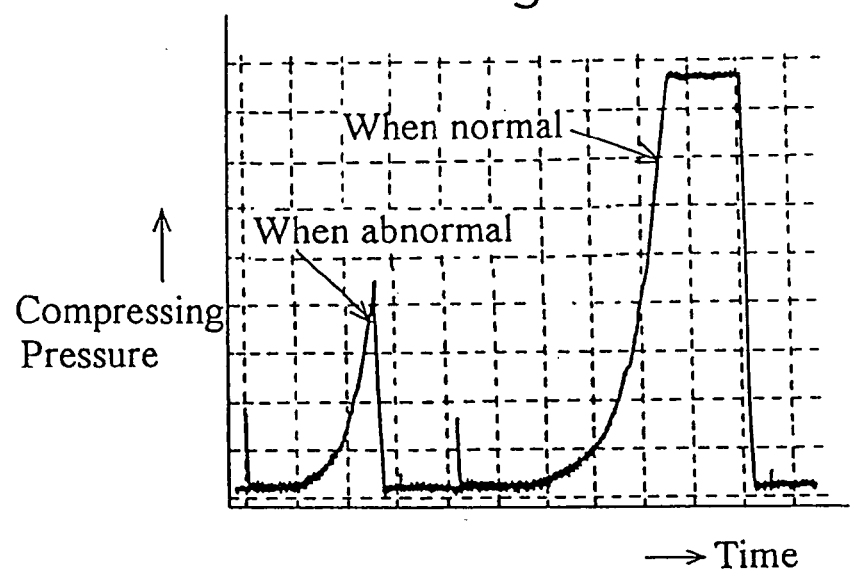
FIG. 6 is a schematic chart showing another graph descriptive of the relationship between applied pressure and time depending on the coolant content.

It is to be noted that where the degree of abnormality is high, the high compressing pressure cannot be permitted as shown in FIG. 6 and compression of the concentrated sludge is impossible. In such case, the following treatment, for example, is to be performed. Specifically, since change in compressing pressure in the normal case and that in the abnormal case give rise to an apparent difference, and in the event that since the ambient temperature (a liquid temperature) is low and the coolant viscosity is high, a phenomenon in which the maximum compressing pressure is not attained, the compressing speed is lowered before the subsequent cycle starts, to thereby make it possible to perform the compressing process. In such case, if the normal compressing process continues several times, the compressing speed is to be progressively increased so that at a predetermined cycle time the compressing speed can be increased to a value effective for the compressing process to be executed, thereby realizing the stabilized compression of the concentrated sludge.

Figure 7:
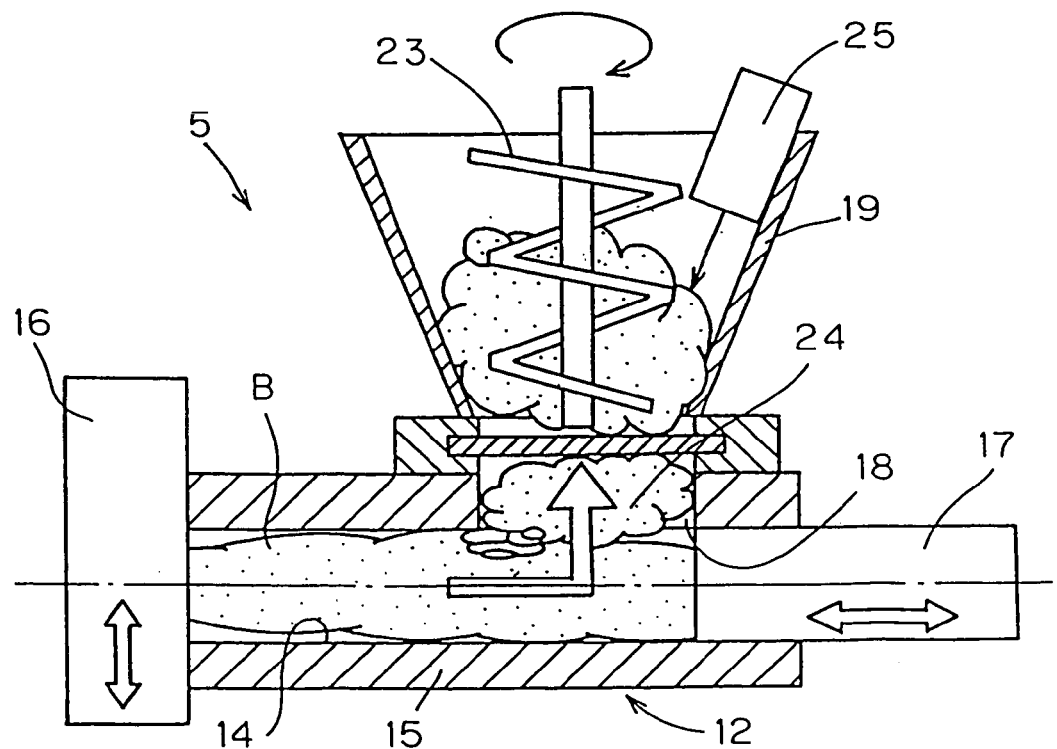
FIG. 7 is a schematic front sectional view of the press unit forming a part of the grinding sludge compacting machine according to a second preferred embodiment of the present invention.

FIG. 7 illustrates the grinding sludge compacting machine 5 according to a second preferred embodiment of the present invention. In this embodiment, the press unit 12 includes a backflow preventive shutter 24 interposed between the hopper 19 and the squeezing chamber 14. The backflow preventive shutter 24 is adapted to be selectively opened and closed by a shutter drive source (not shown) and is opened or closed by the control of a shutter control means (not shown). The hopper 19 includes a rotary blade 23 for forcibly urging the concentrated sludge towards the squeezing chamber 14, aiding the supply thereof into the squeezing chamber 14 or mixing the supplied concentrated sludge. The rotary blade 23 is preferably in the form of a screw shaft.

When using the grinding sludge compacting machine 5 the concentrated sludge containing a large quantity of coolant is compressed continuously, the coolant squeezed during the compressing operation will flow backwardly into the hopper 19 and be accumulated therein and, finally, the concentrated sludge having an increased fluidity as a result of increase of the proportion of the coolant in the concentrated sludge will be supplied into the squeezing chamber 14, resulting in difficulty in performing the compressing process. Accordingly, the provision of the backflow preventive shutter 24 as described above is effective in that by opening and closing the backflow preventive shutter 24 at the time of supply of the concentrated sludge and after the supply of the concentrated sludge, respectively, by the action of the shutter control means an undesirable backflow of the coolant filling up the squeezing chamber 14 towards the hopper 19 can be effectively avoided.

The above discussed phenomenon is apt to occur when the quantity of the concentrated sludge within the hopper 19 becomes small and, accordingly, it is effective to keep the concentrated sludge within the hopper 19 at a quantity equal to or greater than a predetermined value. For this reason, where no backflow preventive shutter 24 is employed, the use may be made of a sensor 25 as shown therein for detecting whether or not the quantity of the concentrated sludge within the hopper 19 is equal to or greater than a predetermined value so that by monitoring the quantity of the concentrated sludge within the hopper 19 a sludge supply means for supplying the concentrated sludge into the hopper 19 can be controlled so as to keep the quantity of the concentrated sludge within the hopper 19 at a value greater than the predetermined quantity. Even with this design, it is possible to alleviate the problem resulting from the supply of the concentrated sludge of a high fluidity into the hopper 19.

It is to be noted that in describing any one of the foregoing embodiments reference has been made to one of the predetermined parameters that affects the squeezing. However, where a plurality of the predetermined parameters are used, for example, a temperature and a coolant content, the respective controls discussed above can be employed in combination.

Also, in describing any one of the foregoing embodiments, the concentrated sludge after having been filtered by the filtering means 4 has been described as supplied into the grinding sludge compacting machine 5 in the form as filtered. However, the present invention can be equally applied to the case in which after the concentrated sludge having been filtered by the filtering means 4 has been pre-compressed by a suitable means, the resultant pre-compressed material is subsequently supplied into the grinding sludge compacting machine 5.

Figure 8:
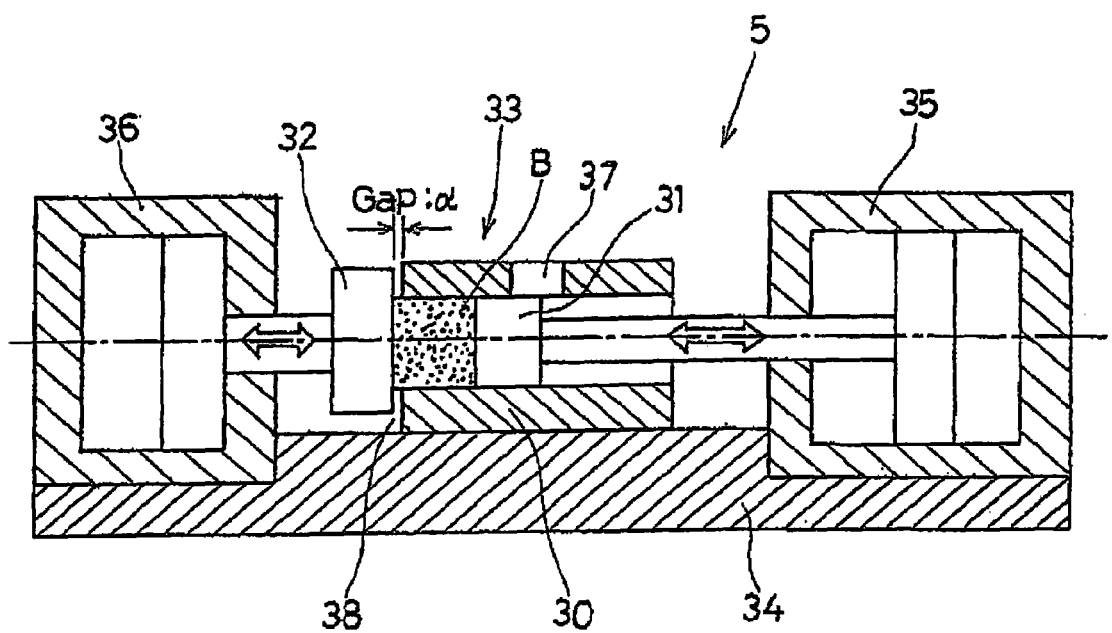
FIG. 8 is a schematic sectional view showing the grinding sludge compacting machine for compressing the grinding sludge according to a third preferred embodiment of the present invention.
Figure 9:
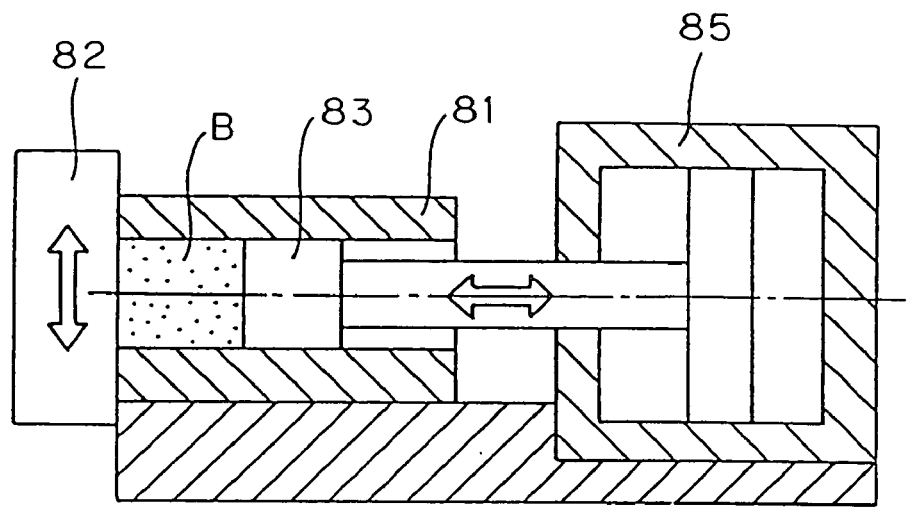
FIG. 9 is a schematic sectional view showing the prior art grinding sludge compacting machine.
Figure 10:
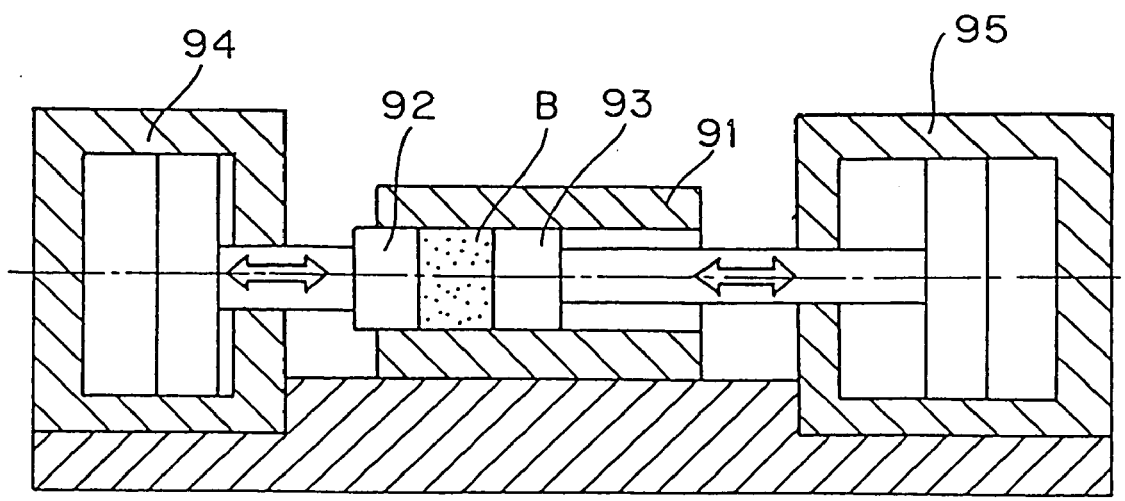
FIG. 10 is a schematic sectional view showing another prior art grinding sludge compacting machine.

Hereinafter, the grinding sludge compacting machine according to a third preferred embodiment of the present invention will be described with reference to FIG. 8. The grinding sludge compacting machine according to this embodiment is so designed as to be immune from any influence brought about by frictional wear that may take place during the compression or compacting operation. The grinding sludge compacting machine is of a plug type double cylinder system and includes a press unit 33 made up of a cylindrical mold 30, a first piston 31 reciprocatingly movably inserted into the cylindrical mold 30, a second piston 32 disposed in face-to-face relation with the first piston 31. The cylindrical mold 30 is fixedly mounted on a machine bench 34 while reciprocating drive means 35 and 36 for driving the first and second pistons 31 and 32, respectively, are mounted on the machine bench 34. Each of the reciprocating drive means 35 and 36 is in the form of a hydraulic cylinder device.

The first piston 31 is utilized for compressing and can be advanced to squeeze the concentrated sludge within the cylindrical mold 30. On the other hand, the second piston 32 is, during the compressing operation, held at a generally advanced position and, for this purpose, the second piston 32 has one end that has a diameter larger than the inner diameter of the cylindrical mold 30. This second piston 32 is capable of being selectively moved between a retracted position, at which the second piston 32 is separated from the cylindrical mold 30 so that the compressed material, that is, the briquette B can be ejected from the adjacent end of the cylindrical mold 30, and a stop position as shown in FIG. 8 that is assumed during the compressing operation. When at the stop position during the compressing operation, the second piston 32 has its end held at a location spaced a distance from the adjacent end face of the cylindrical mold 30 so as to define a gap $\alpha$ that defines a drain passage 38 through which the coolant flows out of the cylindrical mold 30. The gap $\alpha$ is of a size preferably within the range of 0.05 to 1.0 mm and can be regulated by a gap regulating means (not shown). This gap regulating means may be in the form of a projection (not shown) formed, for example, on either one of mutually confronting end faces of the cylindrical mold 30 and the second piston 32, or the size of the gap a may be adjusted by controlling the advanced position of the second piston 32 adjacent the cylindrical mold 30 by means of a piston drive means 36.

The cylindrical mold 30 has a peripheral wall formed with an inlet port 37 for the supply of the concentrated sludge into the cylindrical mold 30. The first piston 31 can be retracted to a position rearwardly of the inlet port 37 and can, when the compressing operation takes place, be advanced with the front end face of the first piston 31, that is a pressure applying surface, positioned forwardly of the inlet port 37.

The operation of the grinding sludge compacting machine 5 according to the embodiment shown in FIG. 8 will now be described. In the first place, the second piston 32 is advanced to and is then held stationary at the position where the predetermined gap $\alpha$ can be formed between the front end face of the second piston 32 and the adjacent annular end face of the cylindrical mold 30, so that the second piston 32 can support a compressing force which will act thereon in a manner as become clear from the subsequent description. While the first piston 31 is moved to the retracted position defined rearwardly of the inlet port 37 with respect to the direction of advance of the first piston 31, a predetermined quantity of the concentrated sludge is supplied into the cylindrical mold 30 through the inlet port 37. Thereafter, the first piston 31 is advanced by the piston drive means 35 with the compressing pressure applied to the concentrated sludge to compress the latter within the cylindrical mold 30. In this way, the coolant contained in the concentrated sludge is squeezed from the concentrated sludge and, on the other hand, the concentrated sludge is compressed to provide a briquette B. The coolant so squeezed is drained from opposite sides of the briquette B, that is, through the coolant drain passage 38, that is defined by the gap $\alpha$ between the second piston 32 and the cylindrical mold 30, and a coolant discharge passage defined by a gap between an outer periphery of the first piston 31 and an inner peripheral surface of the cylindrical mold 30.

Upon completion of the compression, the second piston 32 is retracted by the piston drive means 36 in a direction away from the cylindrical mold 30 so that the first piston 31 can push the resultant briquette B out from the annular open end of the cylindrical mold 30 then opened as a retraction of the second piston 32. After the briquette B has been so pushed out of the cylindrical mold 30, the second piston 32 is advanced to the advanced position adjacent the annular open end of the cylindrical mold 30 in readiness for the subsequent compressing operation. In this way, a cycle of compressing operation to form the briquette B completes and may be repeated to make a corresponding number of briquettes B.

With the grinding sludge compacting machine 5 according to the third embodiment of the present invention, since the second piston 32 can be retracted away from the cylindrical mold 30 to open the annular open end of the cylindrical mold 30, no relative slippage occur between respective surfaces of the second piston 32 and the briquette B such as observed in the conventional gate type and, accordingly, frictional wear hardly occurs in each of those contact surfaces. Sealing required to avoid blow-off of the grinding sludge during the compressing operation is achieved by the gap $\alpha$ defined between the annular end face of the cylindrical mold 30 and the second piston 32. The respective surfaces defining the gap $\alpha$ therebetween are substantially free from frictional wear, as described above, which would otherwise occur. Also, since the sealing is achieved between the above discussed surfaces, unlike the conventional plug-like double cylinder type, even though the inner peripheral surface of the cylindrical mold 30 undergoes frictional wear as the resultant briquette B is compressed or pushed by the first piston 31, the sealing function will not be adversely affected. The grinding sludge compacting machine 5 according to the third embodiment is thus substantially free from any influence which would otherwise be brought about by the frictional wear and can therefore work for a prolonged period of time in a stabilized manner, resulting in reduction in maintenance cost.

Since the gap $\alpha$ is utilized as the coolant drain passage 38, a drain circuit for drainage of the coolant can easily be defined. If this gap $\alpha$ is too small, the drainage of the coolant will be adversely affected, but if this gap α is conversely too large, the grinding sludge will blow off from the cylindrical mold 30. Accordingly, the gap α of a size within the range of 0.05 to 1.0 mm is preferred to secure a favorable drainage of the coolant and, on the other hand, to avoid any possible blow-off of the grinding sludge.

Although the grinding sludge of hardened component parts produced in the grinding line 1 is the one made of ferrous component parts of rolling bearings, the following features can be found on the account thereof. Specifically, during the grinding of the component parts of the rolling bearings, the oil-based coolant is frequently used and the grinding sludge containing the hard, but fine grinding scraps that is difficult to compress tend to be produced. However, considering that such grinding scraps are those resulting from the high quality bearing steels or the like and are generally mass-produced, the grinding of such high quality steels results in the grinding sludge having a stabilized composition. For this reason, if such grinding sludge is compressed, the compressed material, that is, the briquette of a high quality as a settle material can be obtained. Also, conditions for squeezing for the compression can easily be set and, by setting proper conditions, the compression can be achieved stably.

According to the foregoing third embodiment of the present invention, the piston drive means 35 and 36 for the first and second pistons 31 and 32, respectively, have been described as used in the form of a hydraulic cylinder. However, it is to be noted that the piston drive means 35 and 36 may be employed in the form of, for example, a rotary-to-linear motion translating mechanism including, for example, an electric motor and a ball screw mechanism.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A grinding sludge compacting machine to compress and make a briquette of a grinding sludge by inserting a concentrated grinding sludge formed by filtering a grinding sludge, produced in a grinding line by grinding hardened component parts while containing a coolant, into a press unit comprising a cylindrical mold fixed on a machine bench, a first piston reciprocatingly movably inserted in the cylindrical mold and a second piston arranged in face-to-face relation with the first piston, and compressing the concentrated sludge;

a diameter of an end of the second piston being larger than an inner diameter of the cylindrical mold, wherein the end of the second piston defines a gap in cooperation with an adjacent annular end of the cylindrical mold when the second piston is held in position adjacent the cylindrical mold, said gap defining a coolant drain passage.

2. The grinding sludge compacting machine as claimed in claim 1, wherein the gap is of a size within the range of 0.05 to 1.0 mm.

3. A grinding sludge compacting machine to compress a concentrated coolant grinding sludge, to produce a briquette, the grinding sludge compacting machine comprising:

a press unit having a cylindrical mold, a first reciprocating piston movably inserted in the cylindrical mold, and a second reciprocating piston arranged in face-to-face relation with the first reciprocating piston, a diameter of an end of the second reciprocating piston facing an end of the cylindrical mold being larger than an inner diameter of the cylindrical mold, wherein during operation, the end of the second piston is spaced from an adjacent end of the cylindrical mold to define a coolant drain passage.

4. The grinding sludge compacting machine according to claim 3, wherein a range that the end of the second piston is spaced from the end of the cylindrical mold is approximately 0.05 to 1.0 mm.

5. The grinding sludge compacting machine according to claim 3, wherein a gap between an outer periphery of the first reciprocating piston and an inner peripheral surface of the cylindrical mold defines a second coolant drain passage.

6. A grinding sludge compacting machine to compress a concentrated coolant grinding sludge, to produce a briquette, the grinding sludge compacting machine comprising:

a press unit having a cylindrical mold, a first reciprocating piston movably inserted in a first end of the cylindrical mold, and a second reciprocating piston arranged approximately co-linearly with the first reciprocating piston, a diameter of an end of the second reciprocating piston facing a second end of the cylindrical mold opposite the first end being larger than an inner diameter of the cylindrical mold, wherein during a compressing operation, the end of the second piston is spaced from a mutually confronting end of the cylindrical mold to define a coolant drain passage.

7. The grinding sludge compacting machine according to claim 6, wherein a gap between an outer periphery of the first reciprocating piston and an inner peripheral surface of the cylindrical mold defines a second coolant drain passage.

* * * * *